(12) United States Patent
Taube

(10) Patent No.: US 7,565,811 B2
(45) Date of Patent: Jul. 28, 2009

(54) GASEOUS FLUID PRODUCTION APPARATUS AND METHOD

(75) Inventor: Joel A. Taube, Donnellson, IA (US)

(73) Assignee: Climax Molybdenum Company, Phoenix, AZ (US)

( * ) Notice: Subject to any disclaimer, the term of this patent is extended or adjusted under 35 U.S.C. 154(b) by 78 days.

(21) Appl. No.: 11/671,738

(22) Filed: Feb. 6, 2007

(65) Prior Publication Data

US 2007/0130964 A1 Jun. 14, 2007

Related U.S. Application Data

(63) Continuation of application No. 11/251,043, filed on Oct. 14, 2005, now Pat. No. 7,191,603.

(60) Provisional application No. 60/619,436, filed on Oct. 15, 2004.

(51) Int. Cl.
*F17C 9/02* (2006.01)
*B65B 1/04* (2006.01)
*B65B 3/04* (2006.01)

(52) U.S. Cl. .......................................... 62/50.2; 141/3

(58) Field of Classification Search .................. 62/50.2, 62/48.1, 50.6; 141/231, 3
See application file for complete search history.

(56) References Cited

U.S. PATENT DOCUMENTS

| | | | |
|---|---|---|---|
| 3,001,375 A * | 9/1961 | Tauscher | ..................... 62/50.4 |
| 3,800,550 A * | 4/1974 | Delahunty | ................... 62/47.1 |
| 3,804,108 A | 4/1974 | Ferrari | |
| 4,127,008 A * | 11/1978 | Tyree, Jr. | ...................... 62/62 |
| 4,406,129 A | 9/1983 | Mills | |
| 4,555,387 A | 11/1985 | Sabacky et al. | |
| 4,865,832 A | 9/1989 | Kamijyo | |
| 5,045,516 A | 9/1991 | Vogel et al. | |
| 5,185,133 A | 2/1993 | Scheftic et al. | |
| 5,214,925 A | 6/1993 | Hoy et al. | |
| 5,243,821 A | 9/1993 | Schuck et al. | |
| 5,472,749 A | 12/1995 | Dravid et al. | |
| 5,514,350 A | 5/1996 | Kear et al. | |
| 5,572,864 A * | 11/1996 | Jones | .......................... 60/220 |
| 5,582,218 A | 12/1996 | Beale | |
| 5,590,535 A * | 1/1997 | Rhoades | ..................... 62/50.2 |
| 5,665,277 A | 9/1997 | Johnson et al. | |
| 5,698,483 A | 12/1997 | Ong et al. | |
| 5,762,119 A | 6/1998 | Plazt et al. | |
| 5,788,738 A | 8/1998 | Pirzada et al. | |
| 5,804,151 A | 9/1998 | Sweetser et al. | |

(Continued)

*Primary Examiner*—William C Doerrler
(74) *Attorney, Agent, or Firm*—Fennemore Craig, P.C.

(57) ABSTRACT

Gaseous fluid production apparatus according to one embodiment of the invention includes a fluid container containing fluid substantially in the liquid state. A first fluid line is connected to the fluid container so that it receives from the fluid container a first fluid stream substantially in the liquid state. A gas generator is also connected to the fluid container so that it receives from the fluid container a second fluid stream substantially in the liquid state. A product discharge manifold is connected to the gas generator and to the first fluid line. A controller means is operatively associated with the first fluid line and the product discharge manifold for controlling at least one parameter of the first fluid stream. A second controller means is operatively associated with the gas generator and the product discharge manifold for controlling at least one parameter of the second fluid stream.

17 Claims, 1 Drawing Sheet

U.S. PATENT DOCUMENTS

| | | |
|---|---|---|
| 5,820,844 A | 10/1998 | Khan et al. |
| 5,851,507 A | 12/1998 | Pirzada et al. |
| 5,874,684 A | 2/1999 | Parker et al. |
| 5,879,715 A | 3/1999 | Higgins et al. |
| 5,884,488 A | 3/1999 | Gram et al. |
| 5,922,299 A | 7/1999 | Bruinsma et al. |
| 6,058,713 A * | 5/2000 | Bowen et al. .................... 62/7 |
| 6,210,800 B1 | 4/2001 | Nesper et al. |
| 6,505,469 B1 * | 1/2003 | Drube et al. ................. 62/48.1 |
| 6,799,429 B2 | 10/2004 | Drube et al. |
| 7,191,603 B2 * | 3/2007 | Taube ........................ 62/50.2 |
| 2004/0013602 A1 | 1/2004 | Taube |

\* cited by examiner

GASEOUS FLUID PRODUCTION APPARATUS AND METHOD

CROSS REFERENCE TO RELATED APPLICATIONS

The present application is a continuation of co-pending nonprovisional application Ser. No. 11/251,043, filed Oct. 14, 2005, which claims the benefit of an earlier filed co-pending provisional application, Application No. 60/619,436, filed Oct. 15, 2004. These applications are hereby incorporated herein by reference as though fully set forth herein.

TECHNICAL FIELD

This invention relates to apparatus for producing gaseous fluid and more specifically to methods and apparatus for controlling at least one parameter of the gaseous fluid.

BACKGROUND

Temperature and other parametric controls of gaseous fluids for manufacturing or other processes have been found to be desirable. An example is the use of cryogenic fluids as quench fluids for cooling vaporized precursor materials to make nanoparticles. Controlling the temperatures of quench fluids can greatly assist in nano-particle production. Temperature control of quench fluids can affect the number and size of nanoparticles produced, can minimize fluctuations in flow and pressure, and may help to conserve energy.

Temperature control of a quench fluid, particularly a gas, may be achieved in part by mixing the gas with a cooler, liquefied stream of the same gas. Such a liquid/gas mixture of this sort can then be maintained within a range of desired end temperatures to provide for increased flow-rates or to avoid flow-rate fluctuations, for example. However, devices for providing a liquid/gas mixture are not without their problems, as it can be difficult to combine liquid and gas streams depending on the temperatures and pressures involved.

SUMMARY OF THE INVENTION

A method of the present invention comprises supplying a first fluid stream substantially in a liquid state and a second fluid stream substantially in liquid state from a single fluid source. At least a portion of the second fluid stream is vaporized to form a gaseous fluid. The flow rate of at least one of the first and second fluid streams is varied. The method provides for the combining of the first and second fluid streams to produce a gaseous fluid product, at least one parameter of which is affected by the varying of the flow rate of at least one of the first and second fluid streams.

An outlet stream production apparatus of the present invention comprises a fluid container containing fluid in substantially a liquid state. A gas generator is connected to the fluid container. A first fluid line is also connected to the fluid container. The first fluid line is connected to a product discharge manifold via a first valve. The gas generator is also connected to the product discharge manifold via a second valve. The first valve and the second valve are operable to control at least one parameter of an outlet stream produced at the product discharge manifold.

BRIEF DESCRIPTION OF THE DRAWING

The accompanying drawing.

DETAILED DESCRIPTION

Figure 1:
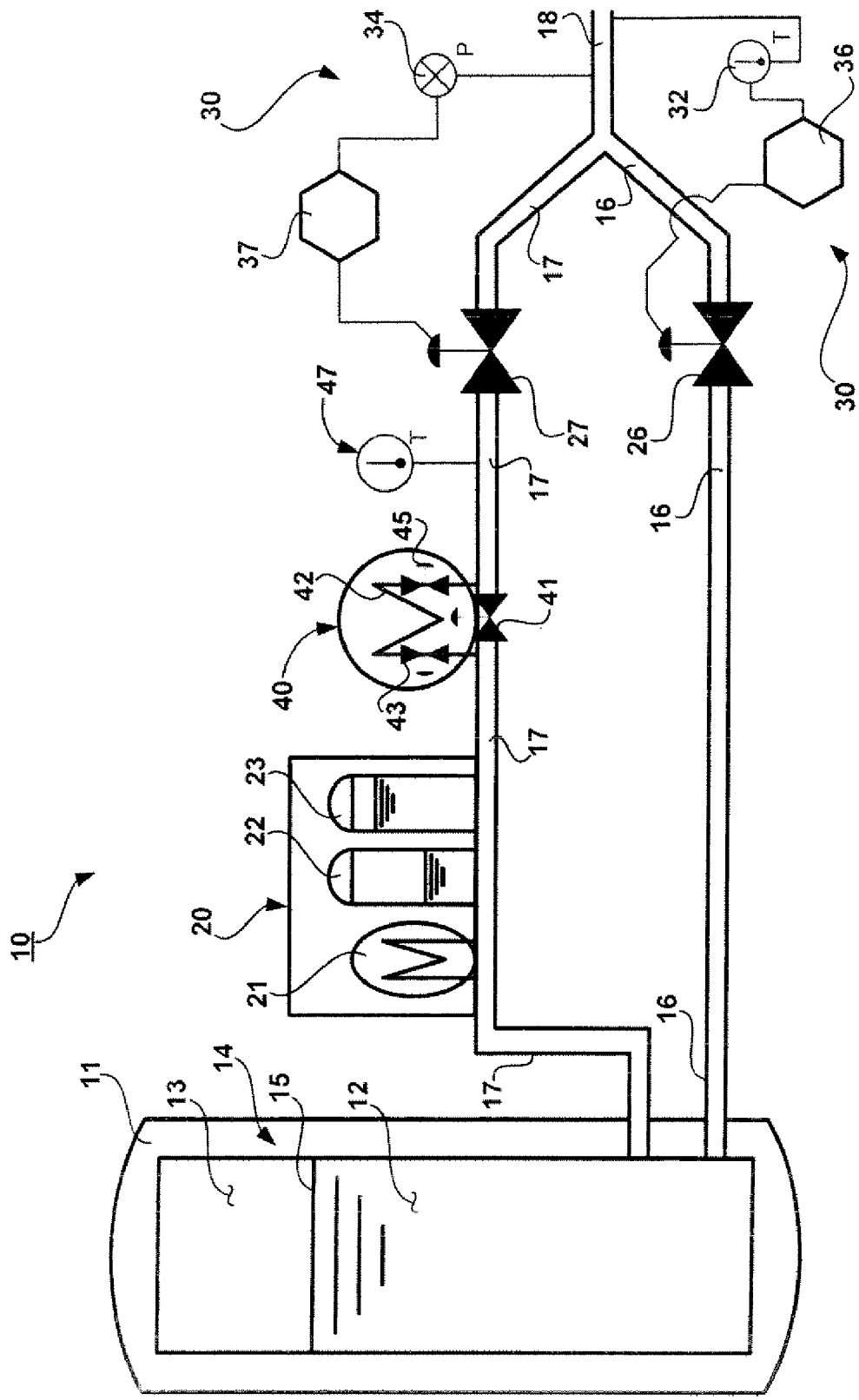
FIG. 1, illustrates a schematic representation of one embodiment of a gaseous fluid production apparatus according to the present invention.

In general, methods of the present invention may be used to produce a gaseous fluid product, or an outlet stream, with a controlled temperature or other parameter. A method of producing an outlet stream with a controlled parameter according to the present invention comprises supplying a first fluid stream in substantially a liquid phase from a single fluid source; supplying a second fluid stream in substantially a liquid phase from the single fluid source; vaporizing at least a portion of the second fluid stream to produce a gaseous fluid and combining the first fluid stream with the second fluid stream to produce a temperature-controlled outlet stream. In other embodiments, a method for producing the temperature-controlled outlet stream may also comprise supplying a desired pressure to the first fluid stream, producing a desired pressure for the outlet stream; minimizing the pressure of the first fluid stream in the liquid phase; and/or controlling the pressure of the first fluid stream to reduce flow fluctuations. Another embodiment may comprise supplying a desired pressure to the second fluid stream, producing a desired pressure for the outlet stream, minimizing the pressure of the second fluid stream in the liquid phase; and/or controlling the pressure of the second fluid stream to reduce flow fluctuations. Still another embodiment comprises supplying a desired pressured to both the first fluid stream and the second fluid stream.

Another embodiment of a method for controlling an outlet stream parameter (e.g., temperature, pressure, flow rate) according to the present invention comprises removing two discrete streams of liquid-phase material from the single source; passing a first one of the two discrete streams through a first line having a first valve; passing the second of the streams through a second line having a gas generator and a second valve; mixing the first and second fluid streams in a controlled relationship to produce an outlet stream with a controlled parameter. In an embodiment where the controlled parameter is temperature, the method may further comprise controlling the temperature to maintain the temperature at a selected value in the range between about the boiling point of the outlet stream and about the ambient temperature.

Moreover, in a further embodiment, the mixing of the first and the second fluid streams (respectively conducted by the first and the second fluid lines) may provide not only for producing a single fluid outlet stream, but also for controlling a parameter of the single fluid outlet stream. Thus, as is explained in more detail below, apparatus of the present invention may provide for a parametrically-controlled outlet stream wherein the controlled parameter is one or more of the temperature, pressure or volumetric flow rate of at least one of the first and second fluid streams, and the outlet stream.

A gaseous fluid production apparatus 10 according to one embodiment of the present invention is illustrated in the drawing FIGURE and may comprise a fluid container 11 containing fluid 14 in at least a liquid phase 12. The fluid 14 is dispensed through respective first and second fluid lines 16, 17 to a product discharge manifold 18. A gas generator 20 is disposed in or otherwise connected to the second fluid line 17, as shown. However, in another embodiment, the gas generator 20 may also be disposed in or otherwise connected to the first fluid line 16. As will be described in greater detail below, the gas generator 20 receives the fluid 14 substantially in the liquid phase 12 and vaporizes at least some of the fluid 14 to produce a gaseous fluid.

The apparatus 10 may be particularly useful with cryogenic fluids, although the present invention is not limited in any respect to cryogenic fluids. "Cryogenic fluid" as used herein refers to liquids that boil at temperatures of less than about 110 K (−163.15 degree C.) at atmospheric pressure. Cryogenic fluids include, but are not limited to, hydrogen, helium, nitrogen, oxygen, argon, air, and methane, Cryogenic fluids may not be suitable when exposed to ambient temperature. That is, when cryogenic fluids in liquid form are exposed to such ambient temperatures, they may quickly reach boiling temperature(s) and thus change state to gaseous form. Often, the actual temperature of cryogenic fluid at its initial boiling temperature has been of little importance, since it is still very cold relative to most ambient temperatures. However, systems desiring particular cryogenic temperatures are emerging and thus controlled parameter (temperature and/or pressure) output fluid streams for those systems may be preferred.

Referring now more specifically to FIG. 1, with respect to another embodiment, the apparatus 10 of the present invention comprises fluid container 11, which may, but need not be, in a tank form. The fluid container 11 is fluidly connected to first and second fluid lines 16, 17 which are ultimately also connected to each other to define, or form, the product discharge manifold 18. The connections of both the first and second fluid lines 16, 17 to the fluid container 11 are generally made in such as way so as to permit the fluid 14 to be conducted from the fluid container 11 in the liquid phase 12. As shown in FIG. 1, for example, such a connection between the fluid container 11 and the first and second fluid lines 16, 17 may be made below the liquid-gas interface 15. FIG. 1 also shows schematically that the fluid container 11 contains the liquid phase 12 of the fluid 14 and may also (but need not) contain a gas phase 13 of the fluid 14, as shown here above the gas-liquid interface 15.

The gas generator 20 may be connected to the second fluid line 17. In the embodiment shown in FIG. 1, the gas generator 20 comprises a heat exchanger 21 and two holding containers 22, 23. An exemplary gas generator 20 is a Trifecta® device from Chart Industries, Inc., based in Cleveland, OH, USA. The gas generator 20 may be of a type which may provide for, separately or in combination, flow control, pressure control or temperature control for the gaseous fluid from the gas generator 20.

The apparatus 10 may be generally operated as follows. The fluid 14 may be drawn from the fluid container 11 in first and second fluid streams flowing into and through the first and second fluid lines 16, 17. As shown and described here, the liquid phase 12 of the fluid 14 is conducted into and, at least initially, flows into the first and second fluid lines 16, 17. The liquid first fluid stream in the first fluid line 16 proceeds to the product discharge manifold 18 while the liquid second fluid stream in the second fluid line 17 proceeds first to the gas generator 20 where it is processed (if necessary). The gas generator 20 changes the second fluid stream from a liquid to a gas, which is then conducted via the second fluid line 17 to the product discharge manifold 18. At the product discharge manifold 18, the second fluid stream is mixed with the first fluid stream to produce an outlet stream 19. The first fluid stream may often still generally be in the liquid phase although some boiling or complete boiling may have occurred in transit. As such, the first fluid stream is generally going to be at a lower temperature than the gaseous phase of the second fluid stream. In such cases, independent parameter (s) (e.g., temperature, pressure and flow rate) of the first and second fluid streams (before mixing) ultimately contribute to and together create the parameter(s) of the outlet stream 19. Therefore, outlet stream 19 may comprise a mixed product and may have different temperature or other parameters (e.g., pressure and flow rate) as compared to either of the first or second fluid streams. Thus, the outlet stream 19 exiting the product discharge manifold 18 may in some instances be considered as occurring in either one gas phase, or in two mixed phases, i.e., gas and liquid.

The first and second fluid streams may be brought together and mixed to produce the outlet stream 19 having a resultant or manufactured parameter (e.g., temperature, pressure, flow rate) at a set level or within a controlled range. As the relative parameters of the first and second fluid streams may be known, selected and/or controlled, then so too may the outlet stream 19 parameters be manipulated, selected and/or controlled. In many cases, the physical, mechanical and/or plumbing constraints (e.g., sizes, shapes, lengths, etc.) of one or more parts of the apparatus 10 (e.g., the first and second fluid lines 16, 17) may contribute to and/or result in the parameters of the first and second fluid streams, thereby affecting the parameters of the outlet stream 19. For that reason, as well as others familiar to those of skill in the art, one or more valves may be inserted in the fluid lines 16, 17 to control the mixing of the first and second fluid streams, and therefore control the parameters of the outlet stream 19. For example, as shown, a first valve 26 may be inserted into the first fluid line 16 and/or a second valve 27 may be inserted into the second fluid line 17.

As shown, the first valve 26 is disposed on the first fluid line 16 and may be used to vary the flow of the first fluid stream in the first fluid line 16 into the product discharge manifold 18 (and the outlet stream 19), thereby regulating the temperature in the outlet stream 19. In operation, the first valve 26 may be completely open, partially open, or completely closed, permitting the outlet stream 19 in the product discharge manifold 18 to receive full input, some input or no input from the first fluid stream. Thus, the first valve 26 may be manipulated to restrict the flow of the first fluid stream to any degree desired. Similarly, the second valve 27 may be used on the second fluid line 17 to provide parametric control of the second fluid stream as it enters the product discharge manifold 18, thus affecting the parameter(s) of the outlet stream 19. In the embodiment shown, the second valve 27 is used to control the pressure parameter. For example, the second valve 27 may be used to reduce the pressure of the second fluid stream to a desired level to assure mixing with the first fluid stream. As in the case of the operation of the first valve 26, the second valve 27 may be completely open, partially open or completely closed, permitting the outlet stream 19 in the production discharge manifold 18 to receive full input, some input or no input from the second fluid stream. The degree of input from the second fluid stream may affect the parameter(s) of the output stream 19. Given that either the first valve 26 or the second valve 27 may be completely closed, the output stream 19 may ultimately contain only one of either the first fluid stream or the second fluid stream. Although in the embodiment shown the first valve 26 is used to control temperature and the second valve 27 is used to control pressure, in other embodiments one or more similar valves may be used to control any parameter of the first and second fluid streams and the output stream 19 either separately or in combination.

Another embodiment may also include an optional control system 30 comprising at least one parametric sensing device. The embodiment shown contains an outlet stream temperature sensor 32 and an outlet stream pressure sensor 34 included in the product discharge manifold 18 to assist in controlling the parameters of the outlet stream 19. For example, the outlet stream temperature sensor 32 may measure a temperature of the outlet stream 19 in, through, at, or upon exit from the product discharge manifold 18. Information from the outlet stream temperature sensor 32 may then be used in determining whether a mechanical change to the apparatus 10 is required to change the temperature of the outlet stream 19 in the product discharge manifold 18. Either of the valves 26, 27 may then be manipulated to effectuate the desired change. In some cases, the temperature indication may call for a change in the contribution from the first fluid stream in the first line 16, and thus call for a manipulation of the first valve 26. In other cases, a manipulation of the second valve 27 may be required to change the contribution from the second fluid stream to the output stream 19.

The embodiment shown also comprises outlet stream pressure sensor 34 for measuring pressure of the outlet stream 19 in, through, at, or upon exit from the product discharge manifold 18. As such, the outlet stream pressure sensor 34 may indicate a needed change in fluid flow in the second fluid line 17. For example, it may be desirable to reduce the pressure of the second fluid stream in the second fluid line 17 to enhance compatibility with the pressure of the first fluid stream in the first fluid line 16, and thus enhance, or merely make possible, the mixing of the first and second fluid streams at the product discharge manifold 18. Furthermore, the use of the first valve 26 with the outlet stream temperature sensor 32 and the use of the second valve 27 with the outlet stream pressure sensor 34, either separately or in combination may be used to provide pressure control of the fluid streams in each of the first and second lines 16, 17. Such pressure control can be used to reduce or minimize flow fluctuations, or flow variances of the outlet stream 19 exiting the product discharge manifold 18.

Although the outlet stream temperature sensor 32 and the outlet stream pressure sensor 34 are optional, such sensors 32, 34 may be preferred in many embodiments in order to provide dynamic or variable parametric control. For example, variable parametric control may permit one or more particular output demands (with respect to temperature, pressure or flow rate, e.g.) to be met. Variable parametric control may also permit a controlled, substantially constant output even if one or more input parameters (temperature, pressure and/or flow rate) are varied.

In one embodiment, the first valve 26 and the second valve 27 may be operated manually. In addition, the information obtained from the outlet stream temperature sensor 32 and the outlet stream pressure sensor 34 may be read manually and interpreted by a person. The valves 26, 27 may also be manipulated manually based on the human interpretation of data produced by the sensors 32, 34. However, in the embodiment shown in the drawing, these activities may be automated by using a temperature controller 36 and a pressure controller 37. As shown schematically, the temperature controller 36 may be disposed between the outlet stream temperature sensor 32 and the first valve 26 to receive input (e.g., a temperature measurement) from the outlet stream temperature sensor 32, and use that input to control (i.e., open, close, or merely restrict, more or less) the flow of the first fluid stream through the first valve 26. The temperature controller 36 may thereby vary the impact that first fluid stream has on the outlet stream 19. Alternatively or additionally, the pressure controller 37 may similarly be used in connection with the outlet stream pressure sensor 34 and the second valve 27. The pressure controller 37 may be disposed between the outlet stream pressure sensor 34 and the second valve 27 to receive input (e.g., a pressure measurement), and use that input to control (i.e., open, close, or merely restrict, more or less) the flow of the second fluid stream through the second valve 27.

The temperature controller 36 and the pressure controller 37 may be programmable as by a human or may be interoperative with one or more other parts of a larger system which may control either one or both of the controllers 36, 37. Although the embodiment shown depicts the temperature controller 36 as disposed between the outlet stream temperature sensor 32 and the first valve 26, and the pressure controller 37 disposed between the outlet stream pressure sensor 34 and the second valve 27, the controllers 36, 37 may be placed in any location as would be familiar to one of skill in the art. Thus, either one or both controllers 36, 37 may be inherent in or disposed on one or the other or both of the respective valves 26, 27. Similarly, either or both controllers 36, 37 may be inherent in or disposed on either one or both of the outlet stream temperature sensor 32 and the outlet stream pressure sensor 34.

Another embodiment, as shown in the drawing, may comprise a supplemental heat exchanger 40 for the primary purpose of ensuring a gas flow in the second fluid line 17, particularly downstream of the gas generator 20. The heat exchanger 40 may, as shown here, include a bypass valve 41, bypass piping 42 and associated bypass inlet valve 43 and bypass outlet valve 45 to control flow in the heat exchanger 40 as would be generally understood by those of skill in the art. A gas generator temperature sensor 47 may also be included to measure the temperature downstream of both the gas generator 20 and the heat exchanger 40 (as shown here) to determine whether the second fluid stream in the second fluid line 17 has been adequately converted to the gas phase. If such conversion is not as desired, the data from the gas generator temperature sensor 47 may be used to adjust the flow through the heat exchanger 40 to add sufficient heat to change the second fluid stream to a gas. The flow through the heat exchanger 40 may be controlled primarily by the bypass valve 41 which may be used to shunt the desired quantity of the second fluid stream in the second fluid line 17 into the heat exchanger 40. Although it is not shown, the gas generator temperature sensor 47 may be connected to at least one controller (not shown) which, in turn, is connected to either the gas generator 20 or heat exchanger 40 (at bypass valve 41), or both, to ensure the desired phase change of the second fluid stream to a gas. The at least one controller (not shown) may be inherent in or on the gas generator 20, or the heat exchanger 40, bypass valve 41 or even on the gas generator temperature sensor 47.

Alternative embodiments may include those in which one or more of the heat exchanger 40, gas generator temperature sensor 47, valves 26, 27, sensors 32, 34, or controllers 36, 37 are not included. An example of an alternative embodiment without valves 26, 27 may involve first and second fluid lines 16, 17 of controlled sizes (lengths, diameters and the like). The thinner the line, the more restricted the flow and the smaller the fluid stream. Thus, in the case where the first fluid line 16 is much thinner than the second fluid line 17, the parametric impact of the first fluid stream on the second fluid stream will be minimized. If the first fluid line 16 were sufficiently thin, the outlet stream 19 exiting the product discharge manifold 18 may appear like the second fluid stream, parametrically. More generally however, the relative size ratios of the first and second fluid streams will impact the parametric control of the outlet stream 19, as determined by the diameter of the first and second fluid lines 16, 17, respectively. Similarly, the relative temperature or pressure change of the first fluid stream due to its length of travel in the first fluid line 16, for example, may contribute to the parameters of the outlet stream 19 at the product discharge manifold 18. For example, a longer travel length can expose a fluid stream to: (a) a greater temperature rise (if the ambient temperature is greater than the fluid boiling point); (b) increased cooling (if the fluid boiling point is higher than the ambient temperature), or (c) greater pressure changes (due to any change of state, e.g., by boiling in the line). In such cases, however, understood and/or pre-selected line sizes, lengths, diameters, connections and the like can contribute to the ultimate parametric control of the outlet stream 19, including control of its temperature. In any case, careful selection of these relative parts can provide for a desired outlet stream 19 parametric control, as for example, within a particular range of temperatures, pressures or volumetric flow rates.

Although a preferred and various optional embodiments have been discussed, the preferred embodiment may include all of the features already described. More particularly, with reference to the drawing, the apparatus 10 may include the fluid container 11 containing fluid 14 at least in the liquid phase 12. Two fluid communication lines (the first fluid line 16 and the second fluid line 17) may be connected to the fluid container 11 in a manner to permit both the first fluid line 16 to receive the first fluid stream substantially in the liquid state and the second fluid line 17 to receive the second fluid stream substantially in the liquid state. In the preferred embodiment, the first fluid line 16 conducts the first fluid stream and the second fluid line 17 conducts the second fluid stream to a connection that defines, or forms, the product discharge manifold 18. The first fluid stream is combined with the second fluid stream at the product discharge manifold 18 to produce the outlet stream 19. The gas generator 20 is disposed in the second fluid line 17 in between the fluid container 11 and the product discharge manifold 18. The gas generator 20 is connected to the heat exchanger 40 and the gas generator temperature sensor 47 via the second fluid line 17. The gas generator 20, the heat exchanger 40 and the gas generator temperature sensor 47 operate in the process of changing the phase of the second fluid stream from liquid to gas, as well as ensure that the proper degree of conversion has occurred. In addition, the gas generator temperature sensor 47 may be connected through a controller (not shown) to either the gas generator 20 or heat exchanger 40 (at bypass valve 41), or both, to ensure the change in phase to a gas. In the preferred embodiment, the second valve 27 may be connected to the second fluid line 17, disposed between the gas generator temperature sensor 47 and the product discharge manifold 18, for controlling the flow of the second fluid stream into the product discharge manifold 18. The first valve 26 may be connected to the first fluid line 16, disposed between the fluid container 11 and the product discharge manifold 18, for controlling the flow of the first fluid stream into the product discharge manifold 18. By controlling the flows of the first and second fluid streams, the first valve 26 and the second valve 27 may therefore be used to control the mixing of the first and second fluid streams in the product discharge manifold 18 to produce the outlet stream 19, thereby controlling at least one parameter of the outlet stream 19. The preferred embodiment also may include the outlet stream temperature sensor 32 in or adjacent the product discharge manifold 18. The outlet stream temperature sensor 32 may be connected to the temperature controller 36 which in turn may be connected to the first valve 26. The outlet stream temperature sensor 32 may be used to measure the temperature of the outlet stream 19, such measurement being used by the temperature controller 36 to regulate the first valve 26, thereby controlling the flow of the first fluid stream into the product discharge manifold 18. Similarly, the preferred embodiment also may include the outlet stream pressure sensor 34 in or adjacent the product discharge manifold 18. The outlet stream pressure sensor 34 may be connected to the pressure controller 37 which in turn may be connected to the second valve 27. The outlet stream pressure sensor 34 may be used to measure the pressure of the outlet stream 19, such measurement being used by the pressure controller 37 to regulate the second valve 27, thereby controlling the flow of the second fluid stream into the product discharge manifold 18. Controlling the flow of the first and second fluid streams may be used to provide at least one desired parameter of the outlet stream 19 exiting the product discharge manifold 18.

It may be noted that connecting both of the first and second fluid lines 16, 17 to the same fluid container 11 and drawing off fluid 14 at least in the liquid phase 12 for both the first and second fluid streams may be advantageous in several respects. For example, better temperature control over the outlet stream 19 may be achieved, because the outlet stream 19 may not be simply a gas phase at a temperature above the gas-liquid phase change temperature point, which may fluctuate depending on pressure and flow rate. As described above, the outlet stream 19 in gaseous form may include separately or in combination a gas mixed with a liquid such that the liquid cools the gas, butt also a gas/liquid mixture where the liquid is suspended in the gas, whether vaporized, colloidally suspended or aerosolized in the gas. In any case, colder temperatures may be achieved by combining a gas stream with a liquid stream. (Although the liquid stream may be only a liquid initially, having at some point vaporized, it should still be generally colder than the primary gas phase stream). Further, the ability to control the temperature of the outlet stream 19 by mixing a gas phase with a liquid phase may provide for desirable cooling affects in another system, which may be limited by using only a single phase—either a gas only form or a liquid only form—of an output fluid to cool. The gas only form may be too hot (relatively) and the liquid only form may be too cold. Moreover, the advantage of using a cooled gas to cool in an operative system allows better control over the cooling rate, and consequently overall better system control. Temperature and flow control can also be improved together when using a cooled gas. When using liquids to control a system temperature, however, temperature variances could cause the flow of the liquid to vary in order to cover those variances, and thereby cause the overall system flow to vary. A controlled temperature gas cooling system can cover the temperature variances without requiring the same sort of flow variances.

The apparatus 10 and method of the present invention also may minimize energy usage, as well as minimizing liquid pressure used in mixing with the gas. For example, the present invention eliminates the need to use two separate containers (not shown), with one containing a fluid in gaseous form and another containing a fluid in liquid form, drawing from the two containers and subsequently mixing the liquid form with the gas form to produce a gaseous product. A two-container system doubles the required inventory and creates operational size problems, as two containers may generally take up twice the space. On the other hand, a single tank containing both a liquid and a separate gas phase may require producing an unacceptably high liquid pressure in order to obtain the gas pressure necessary for mixing to occur. For example, if a fluid were drawn off a single container in two separate liquid and gas phases, the pressure of the gas and liquid should be similar and allow for mixing; however, if a cryogenic fluid were used, the cryogenic fluid in the liquid phase would boil in the line and vaporize, creating an increased pressure in the line, preventing it from mixing with the gas phase drawn off in the other line at the container pressure. Thus, the apparatus 10 of the present invention supplied with cryogenic fluid (or others) may have a desirable effect of minimizing liquid coolant pressure.

The foregoing description has been presented for purposes of illustration and description of the present invention. It is not intended to be exhaustive or to limit the invention to the precise embodiments disclosed. Having herein set forth various embodiments of the present invention, it is anticipated that modifications and variations will naturally occur to those of skill in the art after becoming familiar with the present invention. It is anticipated that such suitable modifications will nonetheless remain within the scope of the invention. The invention shall therefore be construed in accordance with the following claims.

What is claimed is:

1. A method for producing a gaseous fluid product, comprising:
    supplying a first fluid stream substantially in a liquid state from a single fluid source, the single fluid source being stored in a container at a container pressure;
    supplying a second fluid stream substantially in a liquid state from the single fluid source;
    vaporizing the second fluid stream to form a vaporized fluid stream;
    expanding the vaporized fluid stream to reduce the pressure of the vaporized fluid stream; and
    combining the first fluid stream and the vaporized fluid stream to produce the gaseous fluid product.

2. The method of claim 1, wherein supplying first and second fluid streams from the single fluid source comprises supplying first and second cryogenic fluid streams from a single cryogenic fluid source.

3. The method of claim 1, further comprising controlling a temperature of the gaseous fluid product by varying a flow rate of the first fluid stream.

4. The method of claim 3, wherein varying a flow rate of the first fluid stream comprises passing the first fluid stream through a first valve.

5. The method of claim 4, wherein said expanding comprises passing the vaporized fluid through a second valve.

6. The method of claim 5, further comprising:
    sensing a pressure of the gaseous fluid product; and
    operating the second valve based on the sensed pressure of the gaseous fluid product.

7. The method of claim 6, further comprising:
    sensing a temperature of the gaseous fluid product; and
    operating the first valve based on the sensed temperature of the gaseous fluid product.

8. The method of claim 1, further comprising additionally heating the vaporized fluid stream after vaporizing and before expanding.

9. The method of claim 1, wherein said expanding and said combining are performed so as to vary a pressure of the gaseous fluid product so that the pressure of the gaseous fluid product is less than or about equal to the container pressure.

10. The method of claim 1, wherein said expanding and said combining are performed so as to vary a temperature of the gaseous fluid product between about a boiling temperature of the fluid and an ambient temperature.

11. Apparatus for producing a gaseous fluid product, comprising:
    a fluid container containing fluid in substantially a liquid state at a container pressure;
    a gas generator having an inlet end and an outlet end, the inlet end of the gas generator being connected to said fluid container and receiving fluid in a liquid state, said gas generator vaporizing the fluid to form a vaporized fluid stream;
    a first fluid line having an inlet end and an outlet end, the inlet end of the first fluid line being connected to said fluid container and receiving fluid substantially in a liquid state;
    a second valve having an inlet end and an outlet end, the inlet end of said second valve being connected to the outlet end of said gas generator, said second valve expanding the vaporized fluid stream from the gas generator to reduce the pressure thereof; and
    a product discharge manifold having a first inlet, a second inlet, and an outlet, the first inlet being connected to the outlet end of the first fluid line, the second inlet being connected to the outlet end of said second valve, the reduced pressure vaporized fluid stream from said second valve combining with fluid from said first valve in said product discharge manifold to form said gaseous fluid product.

12. The apparatus of claim 11, further comprising a first valve positioned in said first fluid line between said container and said product discharge manifold, said first valve being operable to vary a flow rate of the fluid in said first fluid line.

13. The apparatus of claim 12, further comprising a control system operatively connected to said first and second valves, said control system operating said first and second valves to control the temperature and pressure of the gaseous fluid product discharged from the outlet of said product discharge manifold.

14. The apparatus of claim 13, wherein said control system further comprises:
    a temperature sensor operatively associated with the outlet of said product discharge manifold, said temperature sensor sensing a temperature of the gaseous fluid product;
    a temperature controller operatively associated with said temperature sensor and said first valve, said temperature controller operating said first valve to control the temperature of the gaseous fluid product;
    a pressure sensor operatively associated with the outlet of said product discharge manifold, said pressure sensor sensing a pressure of the gaseous fluid product; and
    a pressure controller operatively associated with said pressure sensor and said second valve, said pressure controller operating said second valve to control the pressure of the gaseous fluid product.

15. The apparatus of claim 14, wherein said temperature controller operates said first valve to vary the temperature of the gaseous fluid product between about a boiling temperature of the fluid and an ambient temperature.

16. The apparatus of claim 14, wherein said pressure controller operates said second valve so that the pressure of the gaseous fluid product is less than or about equal to the container pressure.

17. The apparatus of claim 11, further comprising a supplemental heat exchanger having an inlet end and an outlet end, the inlet end of said supplemental heat exchanger being connected to the outlet end of said gas generator, the outlet end of said supplemental heat exchanger being connected to the inlet end of said second valve.

* * * * *